Jan. 14, 1936.  J. H. HAMMOND, JR  2,027,528
NAVIGATIONAL GUIDE SYSTEM
Filed Oct. 29, 1929  7 Sheets-Sheet 1

INVENTOR.
John Hays Hammond, Jr.
BY Albert M. Austin
ATTORNEY.

Jan. 14, 1936.    J. H. HAMMOND, JR    2,027,528
NAVIGATIONAL GUIDE SYSTEM
Filed Oct. 29, 1929    7 Sheets-Sheet 2

INVENTOR.
John Hays Hammond, Jr.
BY Albert M. Austin
ATTORNEY.

Jan. 14, 1936.  J. H. HAMMOND, JR  2,027,528
NAVIGATIONAL GUIDE SYSTEM
Filed Oct. 29, 1929  7 Sheets-Sheet 4

INVENTOR.
BY John Hays Hammond, Jr.
Albert M. Austin
ATTORNEY

Jan. 14, 1936.　　　J. H. HAMMOND, JR　　　2,027,528
NAVIGATIONAL GUIDE SYSTEM
Filed Oct. 29, 1929　　　7 Sheets-Sheet 5

INVENTOR.
BY John Hays Hammond, Jr.
Albert M. Austin
ATTORNEY.

Jan. 14, 1936.  J. H. HAMMOND, JR  2,027,528
NAVIGATIONAL GUIDE SYSTEM
Filed Oct. 29, 1929  7 Sheets-Sheet 6

INVENTOR.
BY John Hays Hammond, Jr.
Albert M. Austin
ATTORNEY

Patented Jan. 14, 1936

2,027,528

UNITED STATES PATENT OFFICE 2,027,528

NAVIGATIONAL GUIDE SYSTEM

John Hays Hammond, Jr., Gloucester, Mass.

Application October 29, 1929, Serial No. 403,205

13 Claims. (Cl. 250—11)

This invention relates to a navigational guide system and more particularly to a system for designating to a pilot his bearings with reference to a fixed location.

This invention as specifically applied to an aeronautical guide system provides means whereby the pilot of an aircraft may be informed of his position with reference to a landing field and is particularly adaptable to cases where the visibility of this field is poor. This system is advantageous in cases where the aircraft is flying at night or in foggy weather or when clouds intervene between the aircraft and landing field.

In a concrete exemplification of the present invention a system is contemplated in which signals propagated from the aircraft are impressed upon a plurality of direction finders located in various parts of the field. These direction finders are oriented in order to effect a predetermined responsiveness. An angle setting transmission system is associated with said direction finders for propagating signal waves having frequencies which vary in accordance with the degree of orientation of said direction finders.

In the aircraft an indicating device is provided which has mounted thereon a plurality of designating units corresponding to the direction finders located on the field. These designating units are associated with an angle setting receiving system, and oriented in response to the actuation of said receiving system, which is operated in response to the signal waves propagated from the angle transmission system. The said designating units are made to indicate upon a map upon which is registered the characteristics of the field terrane. The position of the craft in relation to the landing field is consequently designated as a continuous operation, so that the pilot can observe how he is navigating with respect to the terrane and can thereby guide his plane safely towards this field.

In a modified form the invention provides for a system in which the designating units in the aircraft are not relatively displaced in accordance with the position of the direction finders on the field. In this system a plotting mechanism is provided which is actuated in response to the orientation of said direction finders. This plotting mechanism translates the angular orientation of the direction finders into a corresponding orientation of units on said plotting mechanism corresponding to the designating units in the aircraft. The translated angular orientation is transmitted to the aircraft by an angular transmission system, so as to automatically actuate the designating units of the indicating device.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which

Like reference characters denote like parts in the several figures of the drawings.

In the following description and in the claims parts will be identified by specific names for convenience, but they are intended to be as generic in their application to similar parts as the art will permit.

Figure 1:
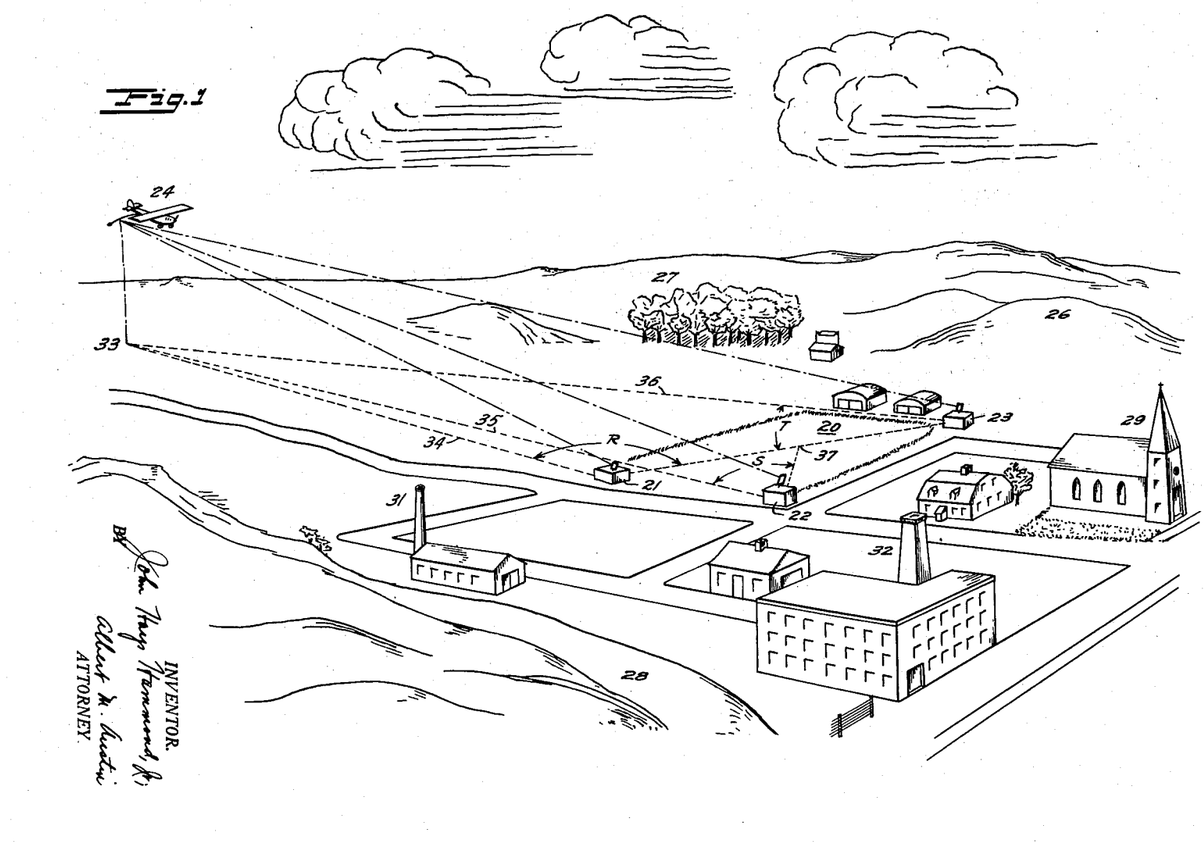
Fig. 1 shows a birdseye view of a landing field and the surrounding country.

In the form of the invention shown in Fig. 1, the landing field is indicated at 20, and the three range finding stations at 21, 22 and 23.

The approaching airplane is shown at 24. Other objects of the landscape are shown, such as a hill 26, forest 27, river 28, church steeple 29 and two tall chimneys 31 and 32. The projection of the airplane on the surface of the earth is indicated at the point 33. Joining this point, with the three direction finder stations are three lines 34, 35 and 36, which form azimuth angles R, S, T, with lines drawn from the direction finder stations to the center of the field 37.

Figures 2, 3:
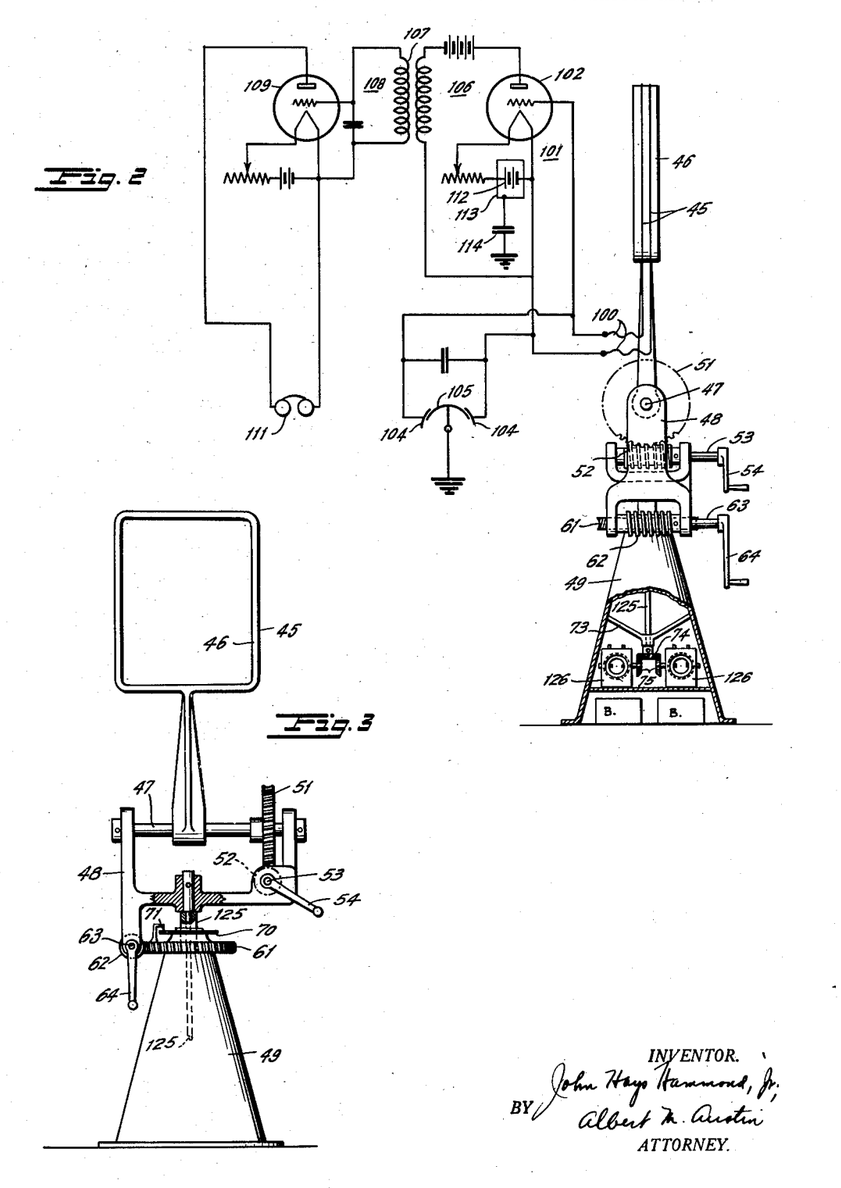
Fig. 2 is a side elevation of one of the direction finders with its associated radio receiving system.
Fig. 3 is a front elevation partly in section of one of the direction finders.

The airplane 24 transmits a wireless signal which is picked up by the direction finder shown in Fig. 2. This direction finder consists of a coil 45 wound around a frame of insulating material 46 which is rigidly secured to a shaft 47. This shaft has a bearing in a frame 48 which is pivotally mounted on a base 49. Secured to shaft 47 is a worm wheel 51 meshing with a worm 52 mounted on a shaft 53 which has bearings in frame 48. To this shaft is fastened a handle 54. Secured to the base 49 is a worm wheel 61 meshing with a worm 62, mounted on a shaft 63, which has bearings in the frame 48. Secured to the end of said shaft 63 is a handle 64.

The coil 45 is connected by flexible conductors 100 to the input circuit 101 of space discharge device 102. A balancing condenser 104, 105 is provided with a pair of stationary plates 104 which are connected to the two terminals of coil 45 and with a movable plate 105 which is connected to ground. Output circuit 106 in space discharge device 102, may be connected through transformer 107, to the input circuit 108 of a second space discharge device, or amplifier 109, the output circuit of which is connected to head phones 111 or other inducting means. Battery 112 which is connected to the filament of space discharge device 102 is preferably enclosed in a shield 113 which is connected through a condenser 114 to ground.

In operation the balancing condenser 103 is adjusted, so that the coil is properly balanced and produces no response in the receiver 111 when it is rotated into a plane normal to the direction of the received signal.

The above described circuit has been shown by way of illustration only, but it is to be understood that coil 45 may be connected to any suitable radio receiving circuit which is capable of receiving the radiant energy signals intercepted by said coil and converting these signals into a form suitable for actuating an inducting device.

In place of the radio pick-up device of the direction finders shown in Fig. 2 a system of sound direction finding may be used. This system may be of any suitable construction actuated in response to compressional waves. The system may be operated in the same manner described in connection with Fig. 2.

Figure 4:
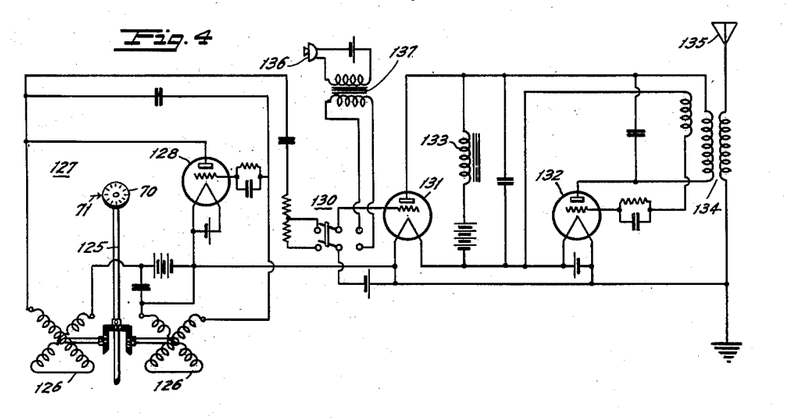
Fig. 4 is a diagram of the angular setting transmission system.

An angle setting transmission system which is adapted to propagate signal waves having frequencies which vary in accordance with the angular position of coil 45 is provided in association with each of the direction finders. (Figs. 2, 3, and 4). This system comprises a shaft 125 pinned to the frame 48. Secured to the shaft 125 is a dial 70 which cooperates with a pointer 71 fixed to the worm wheel 61 to indicate the angular position of the coil 45. The lower end of the shaft 125 is journalled in brackets 73 and carries a bevel gear 74 which meshes with two bevel gears 75—75, pinned to the shafts of the two variometers 126—126 respectively.

In the angle transmission circuit shown in Fig. 4 the pair of variometers 126 are connected in an oscillating circuit 127 of a space discharge oscillator 128. The particular type of oscillator forms no part of the present invention and is not described in detail.

The frequency of the current generated by the oscillator 128 is determined by the inductance of variometers 126 which are in turn controlled by the position of shaft 125.

Oscillator 128 is connected to an amplifying system of any convenient type through double pole double throw switch 130. The amplifying system is shown as comprising the usual amplifier for radio telephone, and comprises a space discharge modulator 131, and high frequency oscillator 132, which are connected through a suitable coupling circuit including inductance 133.

Oscillator 132 is coupled through inductances 134 to a radiating system including antenna 135. Microphone 136 is connected through a transformer 137 to a switch 130 in such manner that modulator 131 and oscillator 132 may be used for speech transmission with microphone 136, or for transmission of high frequency currents, modulated in accordance with the oscillations of oscillator 128. In the latter case it is evident that the frequency radiated is a carrier wave modulated by the frequency generated by oscillator 128 and determined by the angular setting of shaft 125.

In the aircraft, an instrument board 200 is provided (Fig. 8) which has mounted thereon an altimeter 201, a standard compass 202, and a map 203, which has registered thereon the characteristics of the terrane surrounding the landing field. The elevation of various objects on a landscape are indicated on the map, so that the pilot has an accurate survey of the surrounding country.

Figures 6, 7:
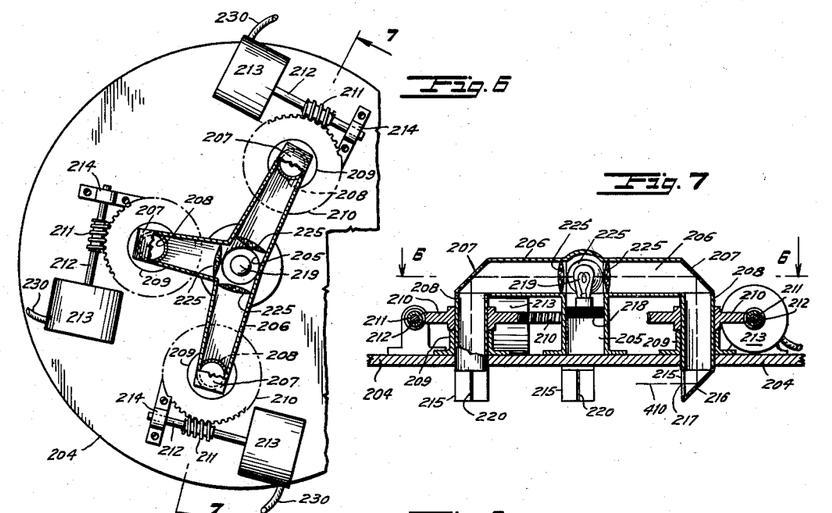
Fig. 6 is a section of the indicating device taken on line 6—6 of Fig. 7.
Fig. 7 is a section of the indicating device taken on line 7—7 of Fig. 6.

The map 203 is mounted on an indicating device shown in Figs. 6 and 7 which in turn is mounted behind the instrument board 200. This indicating device comprises a fixed disc 204 having a hollow support 205 secured thereto. Extending transversely of said support 205 and integral therewith are three tubular extensions 206. Mounted at the end of these tubular extensions at an angle of 45° with the axis thereof, are plates 207 having internal reflecting surfaces. Extending at right angles to these tubular extensions and mounted at the ends thereof are three tubular shafts 208 which are journalled for rotation in flanged sleeve bearings 209. These shafts are located in the same position with reference to the map 203, as the direction finders are located with reference to the field.

Fixedly secured to these tubular shafts 208 are worm gears 210 which mesh with worms 211 carried by the shafts 212 of repeaters 213. The ends of the shafts 212 are journalled in brackets 214 which are mounted upon the disc 204. The tubular shafts 208 are provided with designating units which take the form of plane side extension members 215. These designating units include plates 216 disposed at 45° with the axis of the shafts 208 and provided with internal reflecting surfaces. The sides 217 opposite these plates 216 are provided with narrow longitudinal slits 220.

In the support 205 there is provided a block 218 upon which is mounted a suitable source of illumination, such as incandescent lamp 219. Mounted in the tubular extensions 206 around said lamp are lenses 225 which are arranged to parallelize the rays emitted from the lamp 219.

Figure 5:
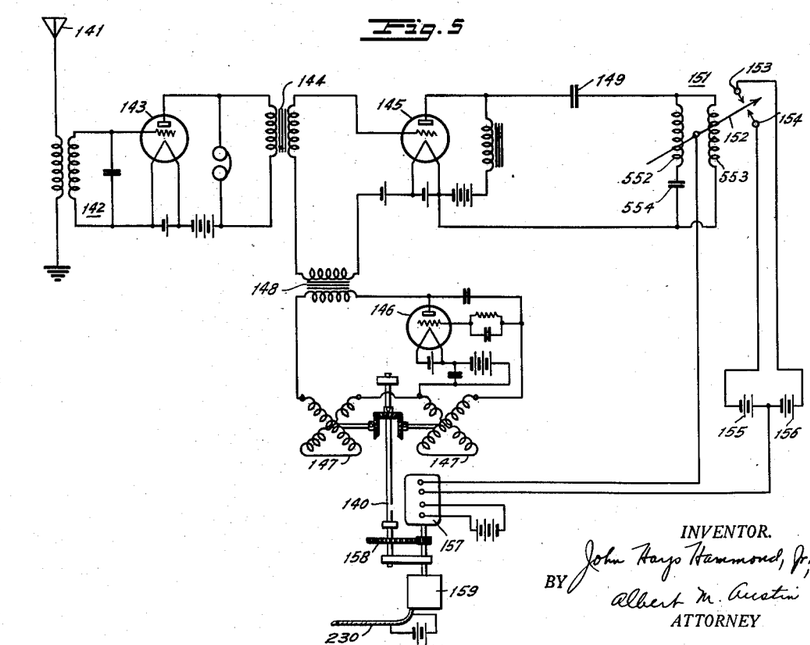
Fig. 5 is a diagram of the angular setting receiving system.

In the angle setting receiving system shown in Fig. 5 the arrangement is such that shaft 140 assumes an angular position corresponding to the frequency of modulation of the received radiant signal and consequently to the position of the shaft 125 in Fig. 4. This is accomplished by associating the receiving antenna 141 with the input circuit 142 of a radio receiver 143. The output circuit of said receiver is connected through transformer 144 to a space discharge rectifier 145. An oscillator 146 is connected to an oscillating circuit of any suitable design including variometers 147 which are mechanically connected to a shaft 140.

Said oscillating circuit 146 is coupled through a transformer 148 to the input circuit of a rectifier 145. The output circuit of this rectifier is connected through a condenser 149 to a dynamometer 151 which consists of two coils 552 and 553 and a condenser 554 which is in series with the coil 552. This dynamometer is provided with a rotatable arm 152 which makes contact at certain times with one or the other of two contacts 153 and 154. These contacts are connected through batteries 155 and 156 to a motor 157 which is mechanically connected to shaft 140 by gears 158.

The oscillating circuit 128 with the variometer 126 of Fig. 4 is so proportioned with respect to the oscillating circuit 146 with the variometers 147 of Fig. 5 that when the shafts 125 and 140 are in corresponding positions the difference in frequency between the oscillator 146 of Fig. 5 and the oscillator 128 of Fig. 4 will be the same irrespective of the angular setting of the shafts.

The torque on the arm 152 is proportional to the currents through the windings 552 and 553 and the cosine of the phase difference of these currents. The condenser 554 and the coil 552 form a circuit tuned to the frequency equal to the difference of frequency between that produced by the oscillator 146 of Fig. 5 and the oscillator 128 of Fig. 4 when the shafts have the corresponding settings.

The operation of the dynamometer is as follows:

When the beat frequency is equal to the frequency to which circuit 552, 554 is tuned, that circuit acts as a pure resistance and current flowing therein is in phase with voltage across the circuit. The current in 553 however is lagging by 90° since 553 is presumably a pure inductance. Hence, current in circuit 552, 554 is in phase quadrature with current in 553 and the armature 152 is not affected. If the beat frequency rises the condenser reactance tends to lessen so that circuit 552, 554 becomes more inductive. Therefore, the current in that circuit tends to lag the voltage across its terminals the same as in circuit 553 hence, the two actions add and the armature 152 is rotated in one direction. When the beat frequency becomes lower than the critical value the reactance of the coil 552 tends to disappear and capacity 554 becomes the main reactance in that circuit. It follows, therefore, that the current in circuit 552, 554 leads the voltage across the circuit terminals. The phase of the current being of opposite sense to the current in circuit 553 hence, the two currents have opposing effects and armature 152 is rotated in the opposite direction. Therefore, when the frequency produced by the rectifier 145 is equal to this difference of frequency, the currents through the two dynamometer windings 552 and 553 are in phase quadrature and no torque results on the arm 152. However, if the beat frequency is either higher or lower than this particular frequency then a torque in one direction or the other is produced, thereby causing the arm 152 to engage contact with either the contact 153 or 154, thus causing the motor 157 to be rotated in one direction or the other which in turn rotates the shaft 140 so as to adjust the variometers 147 to produce a frequency which when combined with a frequency produced by the oscillator 128 will produce the desired beat frequency. This reduces the torque on the arm 152 to zero, which is then brought back to a central position out of engagement with either contacts 153, or 154, thus stopping the rotation of the motor 157. It is thus seen that the shaft 140 will be caused to follow the motion of the shaft 125 in this way transmitting the angle through which the shaft 125 has been turned to the shaft 140.

The shaft of the motor 157 is connected to a transmitter 159 which is electrically connected by means of a cable 230 to the corresponding repeater 213 associated with the indicating device as shown in Fig. 6. Any suitable transmitter and associated transmitter may be used such as that fully described in U. S. Patent 1,431,140 and indicated in Figs. 18, 19 and 20 and 21 of said patent.

Figure 8:
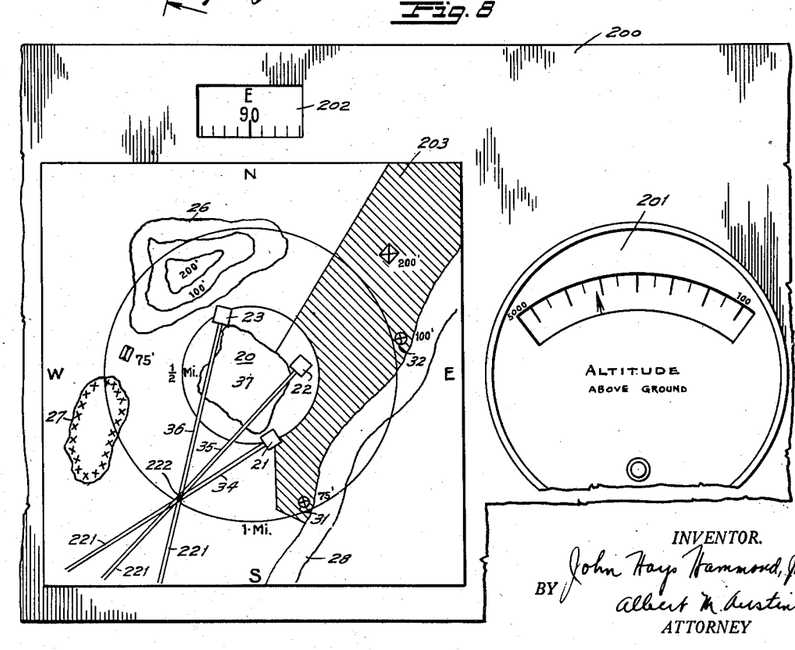
Fig. 8 is a front elevation of the instrument board on the airplane.

The altimeter 201 mounted on an instrument board 200 indicates to a pilot his elevation above the ground. This altimeter may be of any suitable construction and may take the form of radio altimeter described in Science and Invention for February 1929, pages 952-953. This type of altimeter operates in response to the reflection from the ground of radio waves propagated from the plane.

In the operation of this form of navigational guide system, the coil 45 is initially set so that its plane is vertical, and so positioned that the projection on the field of the normal to this plane passing through the center of the coil also passes through the center of the landing field point at 37. (Fig. 1). The other two direction finders are similarly orientated.

When an airplane 24 approaches the field 20, signals are transmitted from the craft by any suitable means. These signals are received by the three direction finder stations 21, 22, 23 by means of the radio receiving circuit shown in Fig. 2. These signals are picked up by the coil 45 and then amplified and impressed upon the head phones 111.

The two systems of reception which may be used are either the maximum or the minimum effect on the coil 45. The minimum effect system will, however, be herein described, although it is obvious that the maximum effect may be used equally as well when found to be advantageous.

The signals received by these direction finders are heard in the head phones 111 and each operator orients coil 45 by means of the handles 54 and 64 in order to effect the reception of a minimum signal. When this condition occurs the plane of the coil is normal to a line from the airplane to the center of the coil. The azimuth angles R, S and T through which the three coils 45 have been turned from their initial position are transmitted to the shaft 125. This actuates the respective angle transmission system (Fig. 4) heretofore described and causes the antenna 135 to propagate signals having the frequency which varies in accordance with the amount of rotational movement of this shaft 125.

In the aircraft these signals are received by the angular receiving circuit (Fig. 5) and translated into a corresponding rotation of the motor 157 and the transmitter 159 as heretofore described.

In the initial adjustment of the indicating device shown in Figs. 6, 7, and 8, the tubular shafts 208 are rotatably set in a position so that the light rays emitted therefrom pass thru point 37 corresponding to the center of the field. The actuation of repeaters 213 effects the rotation of the tubular shafts 208 an amount equal to the azimuthal orientation of the direction finders on the field. The light rays emitted from the source of illumination 219 are reflected from the surface of the plates 207 upon the reflecting surface of the plates 216. From these plates 216 the rays are reflected thru longitudinal slits 220 as straight beams 221. The meeting point 222 of these rays will correspond to the projection of the airplane upon the field and will be indicated upon the map 203, as shown. This meeting point 222 will travel over the map 203 generating a course simultaneously with the displacement of projection 33 of the airplane over the terrane.

It should be noted that thru the agency of the present invention any lag between the displacement of the projection point 33 and the corresponding movement of the point 222 is obviated. The pilot will be able to see on his instrument board the horizontal position of his plane with respect to the landing field. He will also be informed of his elevation above the ground and the characteristics of the landing field, so that if he is destined to this field he will be able to make a safe landing under any condition which may be adverse to the visibility thereof.

It should also be noted that by standardizing the relative position of the direction range finders on various fields, a convenient system will be effected thereby. The aviator will carry a number of maps corresponding to the various landing fields. These maps will be perforated to fit over the designating units, so that upon approaching a particular landing field the aviator can mount the corresponding map upon his instrument board.

Figures 9, 10, 12:
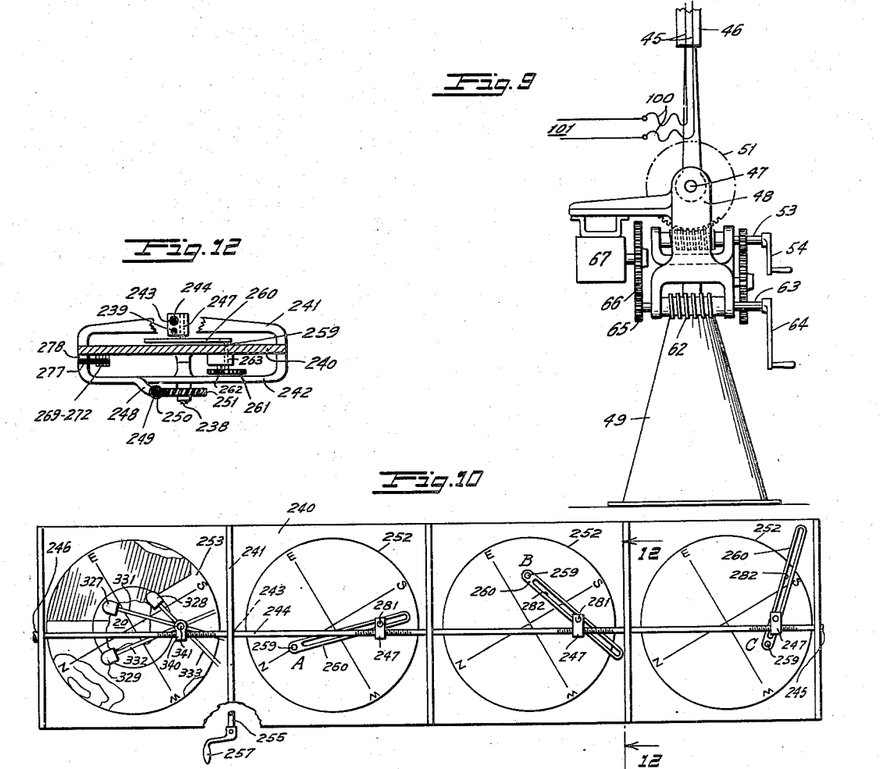
Fig. 9 is a side elevation of one of the direction finders used in a modified form of the invention.
Fig. 10 is a front elevation of the plotting mechanism.
Fig. 12 is a section taken on line 12—12 of Fig. 10.
Figure 11:
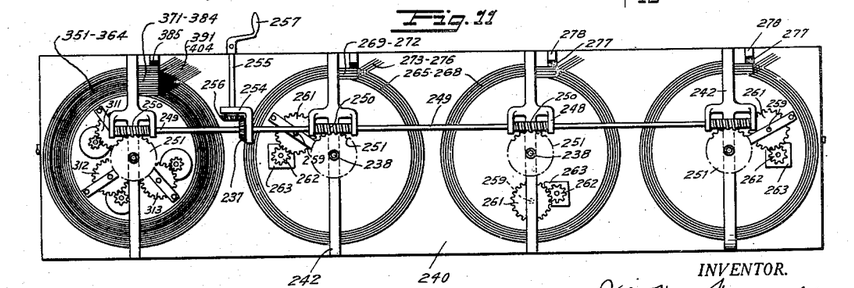
Fig. 11 is a rear elevation of the plotting mechanism.

In certain cases it may be found impractical to standardize the relative position of the range finders in the various fields due to the difference in the characteristics of the respective countries. In that case it will be expedient to have an indicating device in the aircraft which can be adapted to indicate to the pilot his horizontal position under such conditions. A modified form of the present invention is therefore provided, which contemplates such a system. In this modified form three direction finders are provided similar to those heretofore described with respect to the first form of Fig. 2, except that in the modified form as shown in Fig. 9, the shaft 125 with its associated variometers 126 are absent. However, in this modified form a pinion gear 65 is mounted on shaft 63, this gear meshing with gear 66 which is carried by the shaft of transmitter 67 fixed on the frame 48. The radio receiving circuit associated with this modified form of direction finders is the same as that disclosed with reference to Fig. 2. In Figs. 10 to 13 are shown details of the plotting mechanism which comprises a longitudinal frame plate 240 having supporting members 241 and 242 mounted laterally thereon. The members 241 are provided with holes 243 for the reception therein of the plain portion of a longitudinal rod 244. One end of this rod 244 has a collar 245 which cooperates with the end supporting member 241 so as to serve as an abutment against longitudinal displacement of said rod. The other end of this rod is provided with a handle 246 a part of which is shown in Fig. 10.

The supporting members 241 also have passing therethru a plain guide rod 239, which is fixedly mounted with respect to these supporting members.

Each of the supporting members 242 has integrally associated therewith a pair of arms 248 which is offset therefrom and which has journalled therethrough a rod 249. Mounted on this rod between respective arms of each pair 248 are worms 250 which mesh with the worm wheels 251. These worm wheels are pinned to shafts 238 which have mounted thereon for rotational movement circular disc 253 and three circular discs 252 respectively these discs being all of equal diameter. Mounted on the plate 240 is an angular bracket 254 which has journalled therethrough the rod 249 and shaft 255. Fixed to the rod 249 is a bevel gear 237 which meshes with a bevel gear 256 secured to the end of the shaft 255. The other end of the shaft 255 is provided with a handle 257. By this arrangement the rotation of the handle 257 effects the simultaneous rotation of the disc 253 and the three discs 252.

Figure 16:
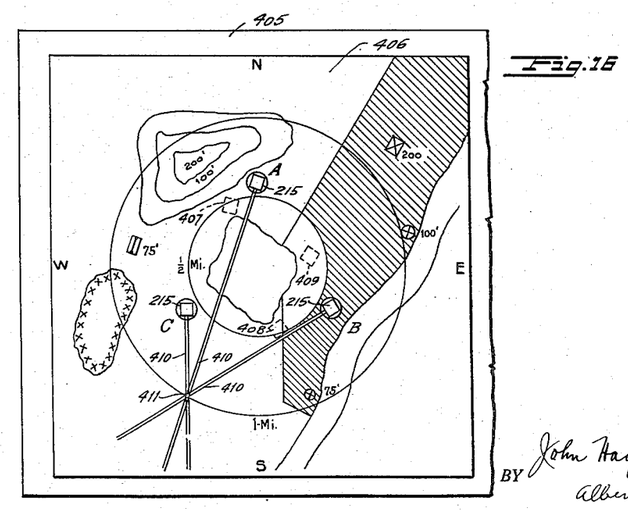
Fig. 16 is a front elevation of part of the instrument board in the modified form.

Passing through each circular disc 252 are pivot shafts 259 mounted with respect to the discs at points A, B, and C, respectively (Fig. 10), corresponding to the point A, B, and C, of the map shown in Fig. 16. One end of these pivot shafts 259 has fixed thereto slotted links 260, the other end having secured thereto gears 261, which mesh with pinions 262 mounted on the shaft of electrical transmitters 263.

Slidably mounted on the rod 244 are sliders 247 which have a threaded engagement with said rod 244. Also passing thru said sliders 247 is the plain rod 239. Fixedly mounted on the sliders 247 are spindles 281 which are adapted to slide along the slots 282 of the links 260. These sliders 247 are located equidistant from the center of their respective disc.

Secured to, but insulated from each of the discs 252 are four circular contact segments 265, 266, 267 and 268. The segments 265 are connected to the common return of all the transmitters 263. The segments 266, 267 and 268 of each disc are connected to the other three wires of their respective transmitter 263. Making contact with these four segments 265, 266, 267 and 268 are four brushes 269–272. These brushes are connected to four conductors 273–276 and are mounted on blocks of insulating material 277 which are secured to supports 278.

Figure 13:
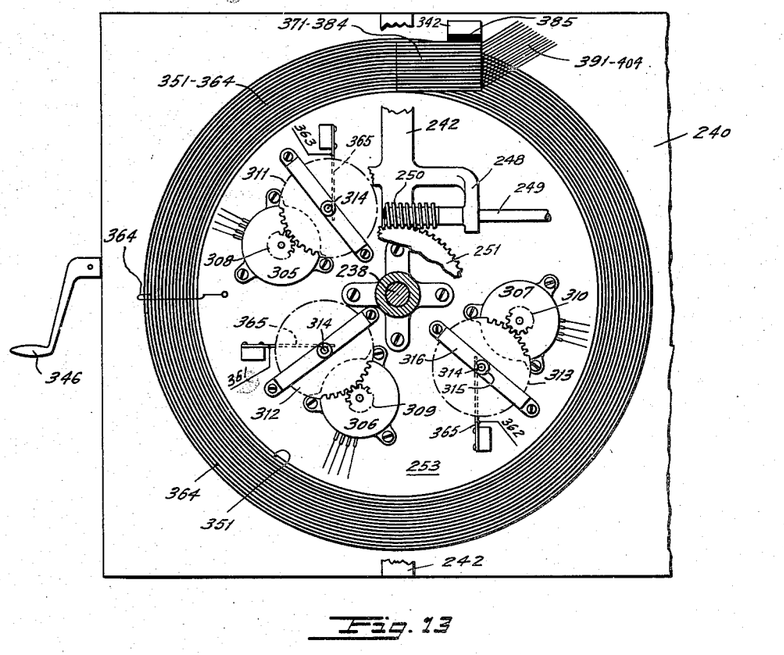
Fig. 13 is a detail of part of Fig. 11.
Figure 14:
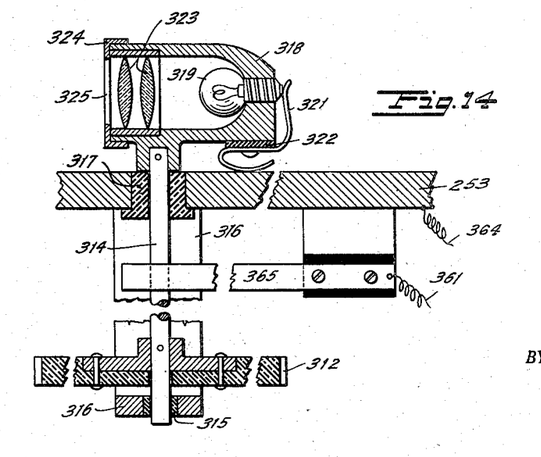
Fig. 14 is a detail of one of the light projectors in the plotting mechanism indicated in Fig. 10.

In Fig. 13 are shown details of the structure and organization embracing the disc 253 of Fig. 10. In this organization, three repeaters 305, 306 and 307 are secured to the disc 253. These are similar to the type described in United States Patent No. 1,431,140 previously referred to. Secured to the shaft of these repeaters are three pinions 308, 309 and 310, which mesh with three gears 311, 312 and 313. These gears are mounted on shafts 314 (see Fig. 14) which are mounted in insulated bearings 315 carried by brackets 316. These shafts are also mounted in insulated bearings 317 in disc 253. Secured to the end of the shaft 314 is a light casing in which is mounted a small incandescent lamp 319. Pressing against the central terminal of this lamp is a spring 321 which is mounted on a piece of insulation 322 carried by the light casing 318. Mounted on the end of the casing 318 is a suitable set of lenses 323 which cause the light from the lamp 319 to be projected as parallel beams. Covering the opening of the casing 318 is a cap 324 which is provided with a slit 325, for causing this beam to be projected in front of the disc 253 as a narrow ray of light.

The three repeaters 305, 306 and 307 control the three light projector units 327, 328 and 329, as seen in Fig. 10. The three beams of light emitted by these light projectors are shown in 331, 332 and 333 respectively. It should be noted that these three light projectors are located in position on the disc 253 corresponding to the relative position of the range finders 21, 22 and 23 with respect to the landing field 20. This field is outlined on the disc 253 as shown in Fig. 10.

Threaded on the rod 244 for slidable movement is an eyepiece 340 which is also mounted on the plain rod 239 and in which is fixed a lens system 341. This lens system is focused on a disc 253 so as to magnify the outline thereof. Cross hairs, (not shown) are mounted on the optical system 341 for indicating the central point of this system. This eyepiece 340 is located the same distance from the center of the disc 253 as the sliders 247 are located from the center of disc 252.

Mounted on the disc 253 are fourteen circular segments 351–364 of conducting material (Fig. 13). The segment 351 is connected to the common return wires of the repeaters 305, 306 and 307. The segments 352, 353 and 354 are connected to the other three wires of the repeater 306. The segments 355, 356 and 357 are connected to the other three wires of repeater 307 and the segments 358, 359 and 360 are connected to the other three wires of repeater 305. The segment 361 is connected to a contact brush 365 which is carried by a piece of insulation mounted on disc 253. This contact brush engages a shaft of the gear 312. The contact segment 362 is connected to a similar brush engaging the shaft of gear 313. The contact segment 363 is connected to a third brush engaging shaft of the gear 311. The contact segment 364 is connected to the disc 253.

Engaging the fourteen contact segments 351–364 are fourteen brushes 371–384 which are connected to fourteen conductors 391–404. These brushes 371–384 are mounted on a block of insulating material 385 which is mounted on a supporting member from the base 340.

The three repeaters 305, 306 and 307 are electrically connected to the three transmitters 67 of the direction finders 21, 22 and 23, so that, as each direction finder is orientated to effect a minimum signal in the head phones 111, the light projecting units 327, 328 and 329 are similarly rotated.

Figure 15:
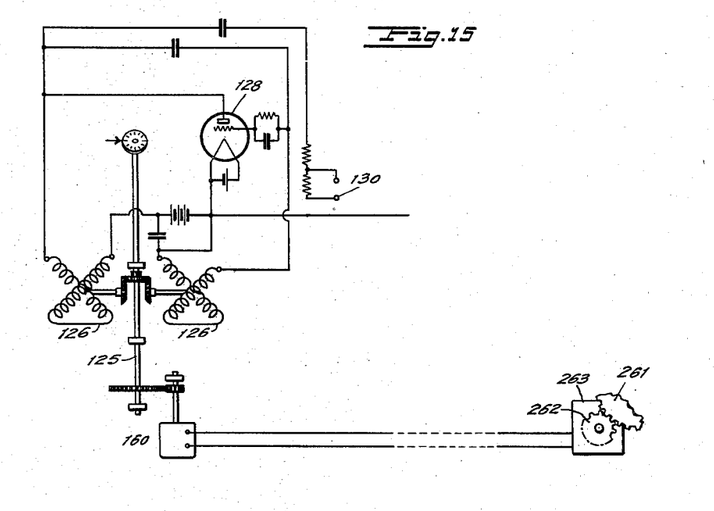
Fig. 15 is a diagram of part of the angular setting transmission system used in the modified form of the present invention.

In Fig. 15 is shown an angle transmission system similar to the system shown in Fig. 4 in which the frequency of the oscillating circuit is determined by the position of the shaft 125. Shaft 125 of Fig. 15, however, is operated directly by repeating mechanism 160 and assumes an angular position determined by said repeating mechanism. This mechanism 160 is electrically connected to the transmitter 263. Each one of the three transmitters 263 is connected to a corresponding angular transmission system, as shown in Fig. 15.

The variometers 126 which are connected in the oscillating circuit of oscillator 128 are operated by shaft 125 in the manner above pointed out whereby the frequency of the current generated by oscillator 128 is proportional to the angular position of repeater 160. Oscillator 128 is connected to an amplifier system of any suitable type as shown in Fig. 4, which has been omitted in Fig. 15 for clearness of description.

In the aircraft an instrument board 405 is provided having mounted thereon a map 406 of the field and an altimeter (not shown) similar to the altimeter 201 of Fig. 8. The squares 407, 408 and 409 on the map indicate the relative position of the direction finders on the field. Mounted on the instrument board 405 is an indicating device similar to that shown in Figs. 6 and 7, except that the tubular shafts 208 in a modified form are positioned to correspond to the relative position of three points A B and C indicated on the map 406. The relative position of these points may be made standard in all aircraft, so as to adapt the indicating device of Figs. 6 and 7 and the plotting device of Fig. 8 to any landing field that the pilot may be destined to.

In the operation of the modified form of the present invention the pilot as he approaches a particular landing field mounts the map 406 corresponding to this landing field upon the instrument board 405. This map is provided with perforations corresponding to the points A B C and these perforations are large enough to fit over the projecting extensions 215 of the tubular shafts 208.

Switches (not shown) are closed which are located adjacent to each direction finder 21, 22 and 23 and which turn on and off the light beams 331, 332 and 333 by closing or opening the circuits thru the conductors 401, 402 and 403 brushes 383, 382 and 381, segments 363, 362 and 361 to the brushes 365, thence along shafts 314, casing 318, to lamps 319. The current returns through springs 321, disc 253, segment 364, brush 384, conductor 404, thru a battery back to the switches located adjacent to the direction finders.

Signals are then sent out from the craft and received by the receiving circuit of the direction finders as heretofore described. These direction finders are then orientated from their initial adjustment in order to effect the reception of a minimum signal. The amount of azimuthal orientation of each direction finder is transmitted by means of a transmitter 67 to repeaters 305, 306 and 307 respectively, thereby effecting a corresponding rotation of the projectors 327, 328 and 329 from their initial adjustment. The initial adjustment of the projectors would be set to correspond to the initial adjustment of the direction finders. The point where the three light beams 331, 332 and 333 intersect on the disc 352 corresponds to the projection 33 of the airplane 24 on the surface of the earth. The handle 246 is then manipulated to move the eyepiece along the rod 244 so as to effect continuous registration of the cross hairs of the eyepiece with the point of intersection of the three light beams. It may be necessary in order to maintain this registration to manipulate the handle 257 simultaneously with the manipulation of the handle 246. This will effect the rotation of the disc 253 and the three discs 252 simultaneously.

It should be noted that the manipulation of a handle 246 causes not only the displacement of the eyepiece 340 along the rod 244, but also the simultaneous displacement of the three sliders 247, so that the axis of the spindle 281 is always located in the same position with respect to the disc 252, as the center of the cross hairs of the eyepiece is located with respect to the disc 253.

The pivot points A, B, and C as heretofore described correspond to the relative location of the extensions 215 with respect to the map 406, so that the links 260 assume a direction corresponding to the direction of the rays 410 emitted from extensions 215. As the sliders 247 are relatively displaced with respect to their respective discs 252, the pivot shafts 259 are caused to rotate effecting thereby a corresponding rotational movement of the shaft of transmitter 263. This rotational movement is repeated in repeater 160 (Fig. 15) effecting thereby the corresponding rotation of shaft 125 and a propagation of signals varying in accordance with the amount of rotation of shaft 125 as heretofore described with reference to Fig. 4.

In the aircraft the signals will be received by a system similar to that shown in Fig. 5. This effects the rotation of the designating units 215. The rays 410 from said units will then meet at the point 411 which corresponds to the projection 33 of the aircraft upon the disc.

In the drawings accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

I claim:

1. In a system for designating to the pilot of a craft his position with reference to a fixed location which comprises means on the craft for transmitting signals, a map in the craft having outlined thereon a facsimile of the scenery adjacent the fixed location, a plurality of designating members mounted in standard designating relationship with respect to said map, a plurality of direction finders dispersed in unstandard positions at various points of the terrain adjacent the fixed location, means for orienting said direction finders in accordance with the direction of receipt of signals emanating from the craft, a plotting mechanism including a plotting surface and a plurality of units mounted in position with respect to the plotting surface corresponding to the position of the direction finders with respect to the terrain, means for orienting said units in accordance with the orientation of said direction finders, a plurality of other units mounted in standard positions on said plotting mechanism, means operable in accordance with the orientation of said first mentioned units for orienting said other units and means for automatically orienting said designating members with respect to the map in accordance with the orientation of the said other units.

2. A system for designating to the pilot of a craft his position with reference to a fixed location which comprises, means on the craft for transmitting signals, a map in the craft having outlined thereon a facsimile of the scenery adjacent said fixed location, a plurality of designating members mounted in standard designating relationship with said map, a plurality of direction finders dispersed in various unstandard parts of the terrain adjacent the fixed location, means for orienting said direction finders in accordance with the direction of signals emanating from the craft, a plotting mechanism located at a distance from the craft and having units mounted thereon disposed with reference to the plotting mechanism in position corresponding to the position of the direction finders, means for orienting said units in accordance with the orientation of said direction finders, a plurality of other units mounted in standard positions on said plotting mechanism, means operable in accordance with the orientation of said first mentioned units for orienting said other units, means for propagating signal waves having frequencies which vary in accordance with the orientation of said other units, means in the craft for transmitting said signal waves into corresponding mechanical actuations and means actuated in response to the actuations of the last mentioned means for orienting said designating members according to said mechanical actuations.

3. In a navigational guide system, a plurality of direction finding units dispersed adjacent a fixed location, means for orienting said units in accordance with the location of a craft, a map in the craft having registered thereon the characteristics of the scenery adjacent the fixed location, a plurality of designating units located in standard points with respect to said map, and means for translating the orientation of said direction finding units into orientations of said designating units on the craft, whereby said designating units are oriented an amount necessary for effecting the designation of the position of said craft with respect to the map.

4. In a navigational guide system, a plurality of direction finding units dispersed adjacent a fixed location, means for orienting said units in accordance with the location of a craft, a map in the craft having registered thereon the characteristics of the scenery adjacent the fixed location, a plurality of designating units located with reference to the map in a position dissimilar to the position of the direction finders with reference to the fixed location, and means for translating the orientation of said direction finding units into orientations of said designating units on the craft, whereby said designating units are oriented an amount necessary for effecting the designation of the position of said craft with respect to the map.

5. A navigational guide system comprising a plurality of direction finders mounted in fixed locations with respect to a field, a plotting mechanism including a plurality of units mounted in position corresponding to the position of the direction finders, means for orienting said units in accordance with the orientation of said direction finders, a plurality of other units mounted in standard positions on said plotting mechanism, means operable in accordance with the orientation of said first-mentioned units for orienting said other units and means controlled by said other units to indicate the position of an object with respect to said field.

6. A navigational guide system comprising a plurality of direction finders mounted in fixed locations with respect to a field, a plotting mechanism including a plurality of units mounted in position relative to a background corresponding to the position of the direction finders, means for orienting said units in accordance with the orientation of said direction finders, a plurality of other units mounted in standard positions on said plotting mechanism, means operable in accordance with the orientation of said first-mentioned units for orienting said other units, signal transmission means controlled by said other units to indicate the orientation of said other units, and means operable in accordance with the signals transmitted by said last mentioned means for designating to the pilot his position with reference to the field.

7. A plotting mechanism of the class described comprising, a disc, a plurality of light projecting units on said disc, means for orienting said units, so that the light rays projecting therefrom intersect at a point, a slider positioned adjacent said disc, means for relatively moving said slider and said disc so as to maintain a continuous registration of said slider with said intersecting point, a plurality of plates, an element mounted on each of said plates in a position dissimilar to the position of the said units with respect to the said disc said element being capable of rotational orientation with respect to the plate, and a slider positioned adjacent each of said plates corresponding in position to the position of the first mentioned slider with respect to its associated disc, means for effecting the relative displacement of the last mentioned sliders with their respective plates corresponding to the relative displacement of the disc and the first mentioned slider and means responsive to the last mentioned means for effecting an orientation of the said elements an amount which is determined from the location of the intersecting point on said disc.

8. In a craft guiding system, means on the craft for transmitting energy waves, means for intercepting said transmitted waves at a plurality of stations remote from the craft but whose positions are known with respect to the surrounding terrain each of said last named means comprising a direction finder, a source of oscillations and means controlled by the movements of the direction finder for controlling the frequency of said oscillations, a source of carrier energy, means for modulating the carrier energy with said controlled frequency oscillations and means for transmitting the resultant energy, a receiver on the craft for intercepting said transmitted resultant energy and deriving therefrom the modulating frequencies, a source of local oscillations, means for comparing the derived modulating frequencies with the frequency of said local oscillations, means controlled by said frequency comparing means for controlling the frequency of said local oscillations so as to bear a predetermined relation to the modulating frequencies, a chart on said craft including angle indicating means, said angle indicating means being placed on said chart in positions corresponding in predetermined manner to the location of the stations as regards the terrain and means controlled by said frequency changing means for controlling said angle indicating means.

9. In a craft guiding system, means on the craft for transmitting energy waves, means for intercepting said transmitted waves at a plurality of stations remote from the craft, each of said last named means comprising a direction finder, a plotting mechanism comprising a disc including a chart representative of the locality in which the said stations are situated, a plurality of direction indicating units on said disc, each of said direction indicating units being positioned with respect to said chart in same relative position as said direction finders with respect to the locality, means controlled by said direction finders for orienting said units so that the direction indicating means intersect at a point on the chart corresponding to the projection of the craft on the said locality, a registration device adapted to be maintained in continuous registration with said intersecting point by means causing movements of said chart and said device, a plurality of related plates, an element mounted on each of said plates in a predetermined position and a slider positioned directly over each of said plates corresponding in position to the position of said registration means with respect to its associated disc, means for effecting a relative displacement of the last mentioned sliders with their respective plates corresponding to the relative displacement of the first named disc and the registration means, and means operable in accordance with the relative displacement of the sliders with respect to their plates to affect an orientation of the said elements an amount which is determined from the location of the intersecting point on said disc.

10. In a craft guiding system, means on the craft for transmitting energy waves, means for intercepting said transmitted waves at at least two separated stations remote from the craft, each of said last named means comprising a direction finder, a plotting mechanism comprising a disc having mounted thereon a chart representative of the locality in which the said stations are situated, a plurality of units including direction indicating means on said disc, the number thereof corresponding to the number of stations, each of said units being in the same relative position with respect to said chart as the position of the respective direction finders with respect to said locality, means controlled by each direction finder for orienting its respective unit so that all the direction indicating means intersect at a point on the chart which corresponds to the projection of the craft on the said locality, a tracer adapted to be maintained in continuous registration with said intersecting point by means causing relative movements between said chart and said tracer, a plurality of related plates, the number thereof corresponding to the number of stations, each plate having pivoted thereon an element at a predetermined point thereof, means for orienting said elements including a slider for each plate positioned directly adjacent thereto, the position of each slider with respect to its plate corresponding to the position of said tracer with respect to its associated disc, means for effecting a relative displacement of said sliders with respect to their plates corresponding to the relative displacement of said tracer with respect to the disc, for effecting an orientation of said elements an amount which is determined in accordance with displacements of said intersecting point relative to said disc, a chart on said craft similar to said first named chart and including a plurality of direction indicating means, the number thereof corresponding to the number of plates, each of said last named means being mounted on said chart in a position which bears the same relation to the chart as the position of each of said elements bears to its respective plate and means controlled by the orientation of said element for controlling said craft direction indicating means whereby the location of said craft with respect to said chart is indicated.

11. In a navigation system, a landing port, a mobile body having a chart or replica of the landing port disposed thereon, means for transmitting radio signalling energy from said mobile body, means for automatically and directionally receiving the transmitted energy at separated points on said landing port, a transmitter at said landing port, a modulation circuit for controlling said transmitter according to the energy received from said mobile body, a receiver on said mobile body responsive to the energy transmitted from the transmitter at said landing port, and means on said mobile body controlled by the receiver thereon for reproducing the position of said mobile body with respect to said landing port on the chart on said mobile body.

12. In a system of navigation, a mobile body, means for transmitting radio frequency signalling energy non-directionally from said mobile body, a landing port, a pair of spacially positioned directional receiving stations at said landing port, means automatically responsive to the received signalling energy at each of said receiving stations for orienting a control member to a position controlled by the position of the mobile body with respect to the landing port, a transmitter at the landing port, means actuated by each of said control members for variably modulating said transmitter according to two different tone frequencies, a chart or replica of said landing port carried aboard said mobile body, and a mechanical movement operated with respect to said chart and adapted to be actuated by the multiply modulated transmitted energy from said landing port for indicting the position of said mobile body with respect to said landing port by a visual reproduction on said chart.

13. In a navigation system, a mobile body adapted to transmit signalling energy non-directionally, a landing port, automatic and directional receiving stations disposed in geographically separated positions at said landing port, said receiving stations each including a loop, means for selectively orienting the loop at each of said receiving stations, a transmitter at said landing port, land wire control circuits extending between said transmitter and each of said receiving stations, mechanical means connected in said line wire circuits and responsive to the orientation of said loops at said directional receiving stations for variably modifying the character of the signalling energy emitted by said transmitter and a receiver on said mobile body responsive to the energy emitted by said transmitted for indicating the position of said mobile body with respect to the landing port.

JOHN HAYS HAMMOND, Jr.